US005921695A

United States Patent [19]

Warner

[11] Patent Number: 5,921,695

[45] Date of Patent: Jul. 13, 1999

[54] ERGONOMICALLY ADJUSTABLE TOOL HANDLE HAVING A DUAL DIRECTION LOCKING DEVICE

[75] Inventor: Donald R. Warner, Columbia Crossroads, Pa.

[73] Assignee: Ingersoll-Rand Company, Woodcliff Lake, N.J.

[21] Appl. No.: 08/996,870

[22] Filed: Dec. 23, 1997

[51] Int. Cl.[6] .................................. F16B 5/02; F16B 7/18

[52] U.S. Cl. ............................... 403/84; 403/87; 403/110; 403/116

[58] Field of Search ................................ 403/83, 84, 110, 403/113, 119, 78, 87, 103, 116; 16/110 R, 111 R, DIG. 41

[56] References Cited

U.S. PATENT DOCUMENTS

| | | | |
|---|---|---|---|
| 583,765 | 6/1897 | McLeod | 403/83 |
| 1,061,217 | 5/1913 | Breeden | 403/84 X |
| 1,671,991 | 6/1928 | Linder | 403/110 X |
| 2,545,659 | 3/1951 | Ginter | 16/110 R |
| 3,308,679 | 3/1967 | Joselyn et al. | 403/119 X |
| 4,368,556 | 1/1983 | Wanner et al. | 16/111 R |

*Primary Examiner*—Lynne A. Reichard
*Assistant Examiner*—John R. Cottingham
*Attorney, Agent, or Firm*—Leon Nigohosian, Jr.

[57] ABSTRACT

An ergonomically adjustable tool handle having a dual direction locking device including a modified swivel retaining plate having an external threaded portion and a corresponding modified jam nut which is threaded to receive the external threads of the retaining plate. A retrofit kit incorporating the locking device optionally includes an anchor bolt having a predetermined length for installation on a conventional tool handle.

17 Claims, 3 Drawing Sheets

ERGONOMICALLY ADJUSTABLE TOOL HANDLE HAVING A DUAL DIRECTION LOCKING DEVICE

BACKGROUND OF THE INVENTION

This invention relates generally to handles for power tools and more particularly to ergonomically adjustable tool dead handles which provide for operator comfort and convenience in a wide range of operating positions.

Use of handheld power tools may require holding the tools in a variety of positions in order to cut, rind, drill, fasten, or perform other operations on a workpiece. Depending on the size or nature of the tool, prolonged out of position operation may lead to serious discomfort and fatigue for the operator. In addition, the nature of some operations involves a possibility of tool jamming, kickback, or other irregularities which may unexpectedly transmit shock loads to the operator's arms.

Usually, if appropriate, power tools are equipped with auxiliary dead handles in addition to the operating trigger grip handle. Some dead handles are permanently fixed to the tool body and cannot be moved. Some other handles, however, may be attached at two or more locations on the tool body in order to optimize the operator's hand locations. Generally, the handles are provided as cylinders, tapered cylinders, or bulbous knobs, and, by permitting the use of two hands in manipulating the tool, improve efficiency by reducing operator fatigue and discomfort.

The dead handles described above are fixed in their angular relationship with the tool body. This, coupled with the circular cross section of the handles which tend to transmit more concentrated physical shock and vibration to the operator's hands and fingers, often forces the operator to maintain his hands and arms in an uncomfortable position which can cause excessive fatigue and a rapid deterioration of accuracy and efficiency.

Other tool handles have been provided which are adjustable incrementally around the axis of the handle. A typical adjustable handle assembly is shown in FIGS. 1 and 2 and, as described in detail below, incorporates a grip handle 11 which may be adjusted in incremental positions. This conventional handle assembly, however, suffers from the inherent drawback that only a finite limit of handle positions may be achieved. Moreover, such conventional adjustable handles are typically attached to a tool body by bottoming out an anchor bolt 24 into a tool body and rely solely on the torque of the anchor bolt to retain the handle in place. As a result, these conventional handles suffer from the drawback that they are easily loosened by tool vibration during operation.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

The present invention provides an ergonomically adjustable tool handle having a dual direction locking device which addresses these and other difficulties of prior art tool handles. The dual direction locking device includes a modified swivel retaining plate having an external threaded portion and a corresponding modified jam nut which is threaded to receive the external threads of the retaining plate. A retrofit kit incorporating the locking device is also provided which in one embodiment additionally includes an anchor bolt having a predetermined length for installation on a conventional tool handle.

It is to be understood that both the foregoing general description and the following detailed description are exemplary, but are not restrictive, of the invention. The foregoing and other aspects will become apparent from the following detailed description of the invention when considered in conjunction with the accompanying drawing figures.

DETAILED DESCRIPTION OF THE INVENTION

Figure 1:
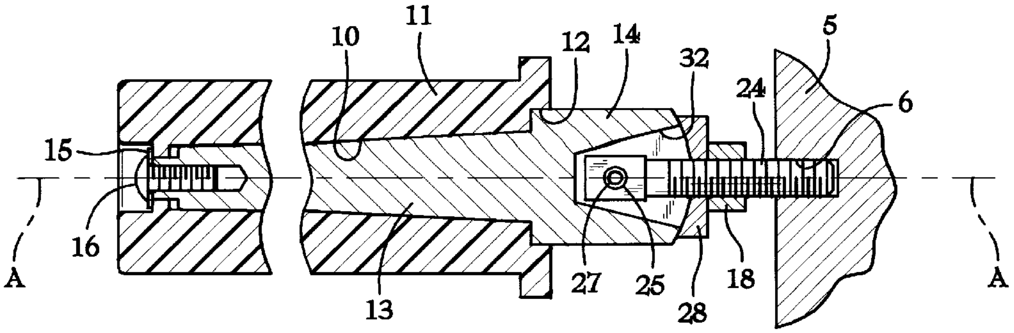
FIG. 1 (PRIOR ART)
FIG. 1 is a partial cross-sectional view of a conventional adjustable handle.
Figure 2:
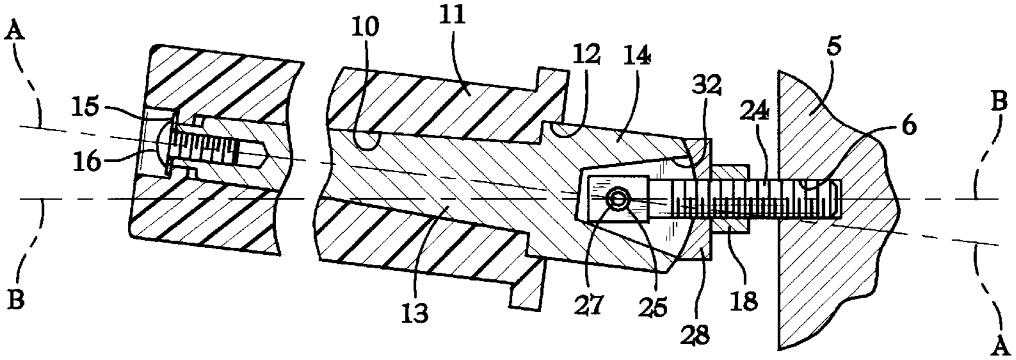
FIG. 2 (PRIOR ART)
FIG. 2 is a partial sectional view of the handle of FIG. 1 in which the handle angle has been incrementally adjusted.

The operation of and advantages provided by the ergonomic tool handle according to the present invention are best understood with an understanding of the operation of a conventional adjustable tool handle shown in FIGS. 1 and 2. Referring now to the drawing, wherein like reference numerals refer to like elements throughout, FIG. 1 shows a conventional adjustable tool handle having a grip handle 11 and a cylindrical tapered handle arbor 13. A hexagonal arbor lock 14 is provided which is integral with tapered handle arbor 13. For purposes of this description, the end of the handle attached to a tool body 5 will be designated "first end", and the opposite or distal end will be designated "second end". Grip handle 11, which has an internal tapered hollow 10 configured to mate with tapered handle arbor 13, is fitted on the tapered handle arbor 13 and is secured in place by a washer 15 and capscrew 16 at the second end. The first end of grip handle 11 is flared and has a twelve point grip handle socket 12 in which arbor lock 14 is indexably gripped to prevent relative rotation between tapered handle arbor 13 and grip handle 11.

Upon fully inserting tapered handle arbor 13 into tapered hollow 10 of grip handle 11, a portion of arbor lock 14 projects from the first end of grip handle 11 beyond the twelve point grip handle socket 12. A sector slot 32 and a pivot bore 50 are provided in the projecting portion of arbor lock 14. An anchor bolt 24 is pivotably mounted in sector slot 32 by aligning a pivot bore 25 located in the head of anchor bolt 24 with pivot bore 50 and inserting a roll pin 27 through the aligned pivot bores. In this manner, by pivotably securing anchor bolt 24 to arbor lock 14, sector slot 32 permits arbor lock 14 to pivot together with attached tapered handle arbor 13 and grip handle 11 about roll pin 27. A retaining plate 28, configured to slide against the riding surface of arbor lock 14, clamps the grip handle 11 at a selected angular position as shown in FIG. 2 by tightening a jam nut 18 on anchor bolt 24 against retaining plate 28.

Attachment of the conventional handle shown in FIGS. 1 and 2 is accomplished by bottoming anchor bolt 24 into a threaded bore 6 located in a tool body 5 until it is tight. The torque of anchor bolt 24 retains the handle in place.

Adjustment of the conventional handle into various positions is accomplished by first adjusting the rotational position of grip handle 11 around axis "A—A" shown in FIG. 1. This is performed by first loosening cap screw 16 and withdrawing grip handle 11 far enough to free hexagonal arbor lock 14 from twelve-point grip handle socket 12. Grip handle 11 is then rotated to select and mate the arbor lock 14 with the incremental position permitted by grip handle socket 12 which is closest to the position most comfortable to the operator. Cap screw 16 is then tightened to hold grip handle 11 in registration with arbor lock 14.

The angle of grip handle 11 in a plane containing axis "A—A" of anchor bolt 24 is then adjusted by loosening jam nut 18, if tight, to permit the surface of arbor lock 14 to freely slide against the riding surface of retaining plate 28. Grip handle 11 is pivotally adjusted and jam nut 18 is tightened to secure retaining plate 28 against arbor lock 14, thereby fixing the position of grip handle 11 along the axis "B—B" shown in FIG. 2.

As discussed above, conventional handles such as those shown in FIGS. 1 and 2 suffer from several drawbacks. First, conventional adjustable handles are capable of being located only in the incremental positions permitted by the twelve point grip handle socket 12. As a result, only a finite limit of handle positions may be achieved. In addition, because such conventional adjustable handles rely solely on the torque of the anchor bolt 24 to retain the handle in place, conventional handles suffer from the drawback that they may be easily loosened during operation inadvertently by an operator or by tool vibration.

According to the present invention a dual direction locking device, which includes a modified retaining plate and a modified jam nut, and an adjustable tool handle incorporating the locking device are provided which addresses these and other difficulties of prior art tool handles. Turning now to the exploded perspective view of FIG. 3, the component parts of the ergonomically adjustable handle of the present invention which are the same as the conventional component parts, described above and shown in FIGS. 1 and 2 are referenced using like numbers. According to the present invention, three modifications to the conventional design have been made.

The first modification is the addition of an external threaded portion having a longitudinal bore to conventional retaining plate 28 which is located on the surface opposite the riding surface. The result is a retaining plate 29 having a longitudinal bore and external threads 30 according to the present invention as shown perspectively in FIG. 3 and in cross-section in FIG. 4.

Figure 4:
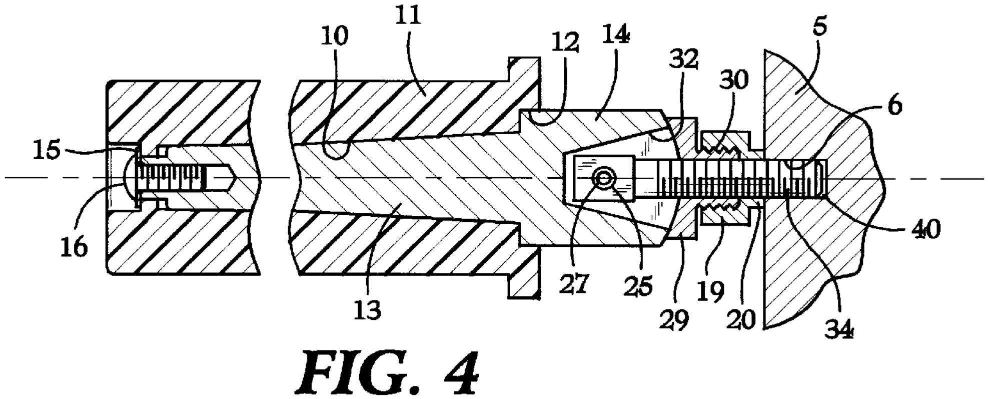
FIG. 4 is a partial cross-sectional view of the handle of FIG. 3.
Figure 3:
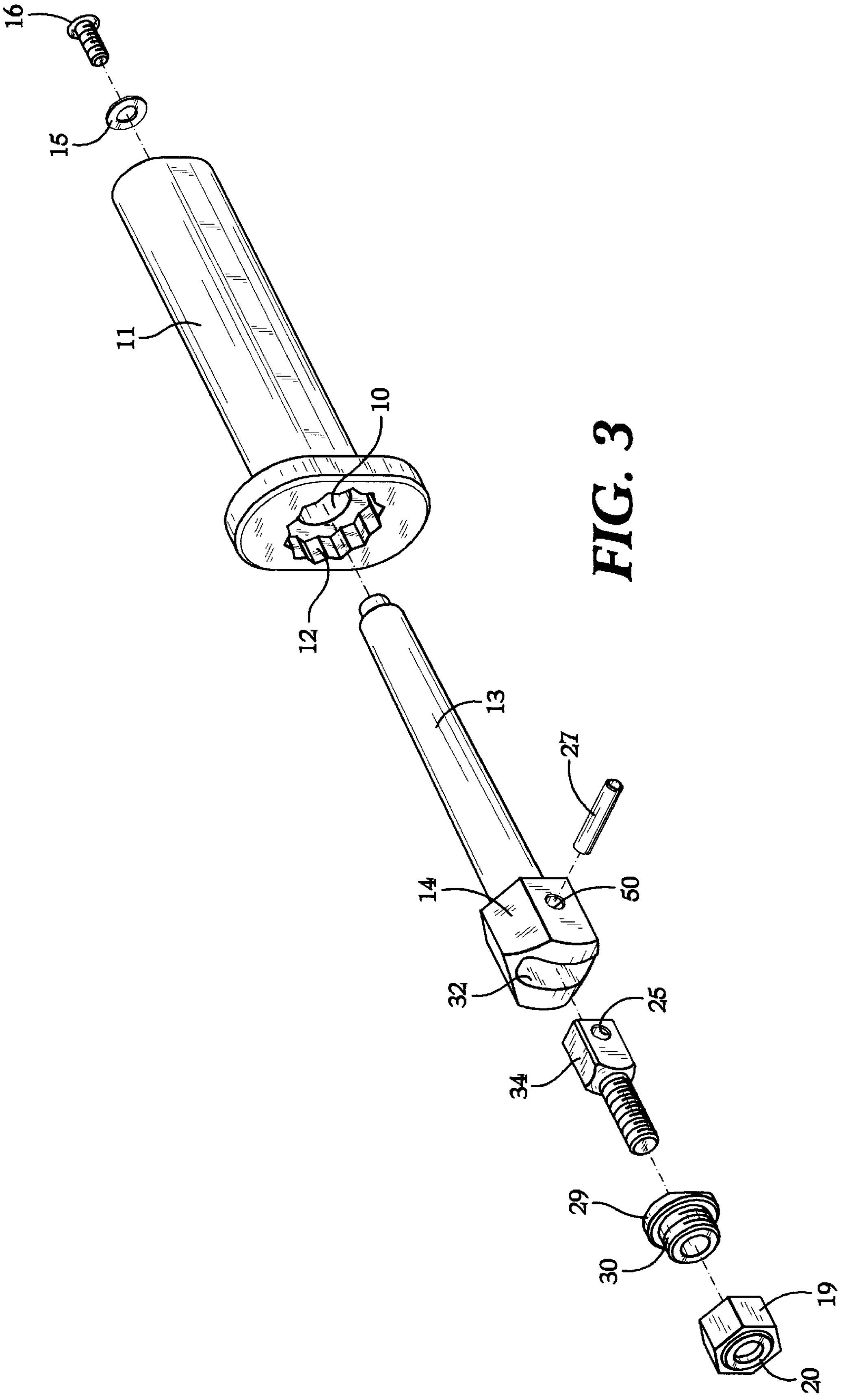
FIG. 3 is an exploded perspective view of the ergonomically adjustable handle according to the present invention.
Figure 5A:
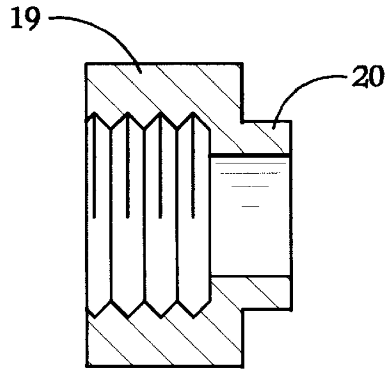
FIGS. 5A, 5B, and 5C illustrate various jam nut configurations according to the present invention.

The second modification is the replacement of conventional jam nut 18 with a jam nut 19 according to one embodiment of the present invention which, as shown in FIGS. 4 and 5A, is threaded to receive external threads 30 of retaining plate 29. A neck portion 20 is located on jam nut 19 as shown in FIGS. 3, 4, and 5A. By this arrangement, upon rotation of jam nut 19 so that it backs away, i.e., unscrews, from the external threads 30 of retaining plate 29, both jam nut 19 and retaining plate 29 are forced to move simultaneously in dual directions away from one another. Continued rotation of jam nut 19 in this manner causes neck portion 20 of jam nut 19 to be forced against tool body 5 while the riding surface of retaining plate 29 is simultaneously forced against arbor lock 14. In this manner, jam nut 19 and retaining plate 29 are wedged between arbor lock 14 and tool body 5, thereby, providing the dual direction locking device of the present invention which locks grip handle 11 in a fixed position relative to tool body 5.

A retrofit kit which incorporates the locking device and can additionally include an anchor bolt having a predetermined length for installation on a conventional tool handle is also provided. In the case that an existing adjustable tool handle is to be retrofitted with the locking device of the present invention, a third modification is provided which comprises replacing anchor bolt 24, if necessary, with an anchor bolt 34. Anchor bolt 34 is similar to anchor bolt 24 in all respects except that anchor bolt 34 is of a length which permits adjustment of the gap width between tool body 5 and the riding surface of arbor lock 14 to permit wedging of the locking device of the present invention as described in detail below.

An exploded view of the component parts of the ergonomic tool handle according to the present invention prior to assembly is shown in FIG. 3. Assembly of the ergonomic tool handle according to the present invention is identical to that of the conventional tool handle described above except that anchor bolt 24, retaining plate 28, and jam nut 18 are replaced, respectively, by anchor bolt 34, retaining plate 29 having external thread 30, and jam nut 19. Prior to attaching the tool handle of the present invention to a tool body, jam nut 19 is tightened onto external thread 30 of retaining plate 29 to permit these components to be later wedged in place by unscrewing them relative to one another.

Attachment of the assembled ergonomic tool handle according to the present invention is accomplished by threading anchor bolt 34 into a threaded bore 6 located in a tool body 5 as done before for the conventional tool handle described above. However, rather than bottoming out the anchor bolt and relying on the torque created to retain the handle in place, according to the present invention, anchor bolt 34 is unscrewed slightly to back it off a small amount thereby creating a space 40 in threaded bore 6. The angle of grip handle 11 around the axis of anchor bolt 34 is first rotated and set in an incremental position using hexagonal arbor lock 14 and twelve-point handle socket 12 as described in detail above.

Grip handle 11 is then rotated and pivoted relative to anchor bolt 34 by first backing jam nut 19 away from retaining plate 29 by unscrewing jam nut 19 from the external threads 30 until neck portion 20 of jam nut 19 is forced against tool body 5 and the riding surface of retaining plate 29 is simultaneously forced against arbor lock 14. In this manner, jam nut 19 and retaining plate 29 are wedged between arbor lock 14 and tool body 5, thereby, simultaneously and securely locking these parts in a fixed relative position. Alternatively, positional adjustment of grip handle 11 may be accomplished entirely without the need for incrementally adjusting grip handle 11 using arbor lock 14 and grip handle socket 12. This is accomplished by rotating and pivoting grip handle 11 into position around anchor bolt 34 prior to wedging jam nut 19 and retaining plate 29 in place.

Thus, the jam nut 19 and retaining plate 29 of the locking device of the present invention permits the rotational adjustment of anchor bolt 34 which, when used alone or in combination with the incremental adjustment of grip handle 11, permits simultaneous positioning of the tool handle into infinite, rather than incremental, positions with respect to both planes of adjustment relative to a tool body.

Figure 5B:
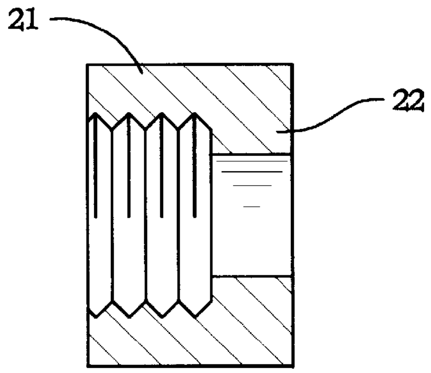
Figure 5C:
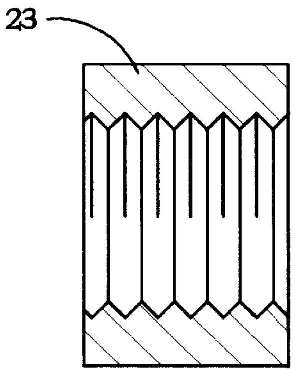

Although jam nut 19 is described above with respect to the preferred embodiment shown in FIGS. 3, 4, and 5A, which incorporates a neck portion 20 to securely fasten jam nut 19 in place by concentrating the axial stresses exerted against tool body 5, other jam nut configurations may be incorporated for wedging the locking device in place. Shown in FIGS. 5B and 5C are alternative jam nuts 21 and 23, respectively, which may also be used in the locking device of the present invention. Jam nut 21 incorporates a shoulder portion 22 rather than a neck portion while jam nut 23 contains only a cylindrical internal threaded portion.

Although illustrated and described above with respect to certain specific embodiments, the present invention is nevertheless intended to be limited to the details shown. Rather, various modifications may be made in the details within the scope and range of equivalents of the claims and without departing from the spirit of the invention.

What is claimed is:

1. An ergonomically adjustable tool handle comprising:

a handle member having first and second end portions, each end portion having a common longitudinal axis, a releasable lock means for locking said handle member in a position relative to a tool body, said lock means comprising a retaining means having an external threaded portion and a retaining plate, said retaining plate having a riding surface configured to mate with said first end portion of said handle member and a surface opposite said riding surface on which said external threaded portion is disposed, and a threaded engaging means which engages said external threaded portion of said retaining means, wherein said threaded engaging means is rotatable to cause said retaining means and said threaded engaging means to move apart.

2. The adjustable tool handle of claim 1, wherein said retaining plate further comprises a longitudinal bore and means disposed within said longitudinal bore for attaching said first end portion of said handle member to a tool body.

3. The adjustable tool handle of claim 2, wherein said means for attaching is an anchor bolt comprising a first end having a threaded portion for engaging a threaded bore hole located in a tool body and a second end attached to said first end portion of said handle member.

4. The adjustable tool handle of claim 3, wherein said second end of said anchor bolt is pivotably mounted to said first end portion of said handle member.

5. The adjustable tool handle of claim 3, wherein said anchor bolt is a predetermined length which, upon threadingly engaging said first end of said anchor bolt in said threaded bore hole in a tool body, creates a gap width between said first end portion of said handle member and a tool body such that upon rotating said threaded engaging means to move apart from said retaining means, said threaded engaging means and said retaining means wedge in said gap.

6. The adjustable tool handle of claim 1, wherein said threaded engaging means is a jam nut having a first open end face for receiving said external threaded portion of said retaining means and a second open end face opposite said first end face configured to abut against a tool body.

7. The adjustable tool handle of claim 6, wherein said second open end face of said jam nut further comprises a jam surface selected from the group consisting of a neck portion and a shoulder portion.

8. A retrofit kit for an ergonomically adjustable tool handle member having a first end portion which is attachable to a tool body comprising:

a releasable lock means for locking said handle member in a position relative to a tool body, said lock means comprising a retaining means having an external threaded portion and a retaining plate, said retaining plate having a riding surface configured to mate with said first end portion of said handle member and a surface opposite said riding surface on which said external threaded portion is disposed, and a threaded engaging means which engages said external threaded portion of said retaining means, wherein said threaded engaging means is rotatable to cause said retaining means and said threaded engaging means to move apart.

9. The retrofit kit of claim 8, wherein said retaining plate further comprises a longitudinal bore and means disposed within said longitudinal bore for attaching said first end portion of said handle member to a tool body.

10. The retrofit kit of claim 9, wherein said means for attaching is an anchor bolt comprising a first end having a threaded portion for engaging a threaded bore hole located in a tool body and a second end attached to said first end portion of said handle member.

11. The retrofit kit of claim 10, wherein said second end of said anchor bolt is pivotably mounted to said first end portion of said handle member.

12. The retrofit kit of claim 10, wherein said anchor bolt is a predetermined length which, upon threadingly engaging said first end of said anchor bolt in a threaded bore hole in a tool body, creates a gap width between said first end portion of said handle member and a tool body such that upon rotating said threaded engaging means to move away from said retaining means, said threaded engaging means and said retaining means wedge in said gap.

13. The retrofit kit of claim 8, wherein said threaded engaging means is a jam nut having a first open end face for receiving said external threaded portion of said retaining means and a second open end face opposite said first end face configured to abut against a tool body.

14. The retrofit kit of claim 13, wherein said second open end face of said jam nut further comprises a jam surface selected from the group consisting of a neck portion and a shoulder portion.

15. A locking device for an ergonomically adjustable tool handle member having a first end portion which is attachable to a tool body comprising:

a releasable lock means for locking said handle member in a position relative to a tool body, said lock means comprising a retaining means having an external threaded portion and a retaining plate, said retaining plate having a riding surface configured to mate with said first end portion of said handle member and a surface opposite said riding surface on which said external threaded portion is disposed, and a threaded engaging means which engages said external threaded portion of said retaining means, wherein said threaded engaging means is rotatable to cause said retaining means and said threaded engaging means to move apart.

16. The adjustable tool handle of claim 15, wherein said threaded engaging means is a jam nut having a first open end face for receiving said external threaded portion of said retaining means and a second open end face opposite said first end face configured to abut against a tool body.

17. The adjustable tool handle of claim 16, wherein said second open end face of said jam nut further comprises a jam surface selected from the group consisting of a neck portion and a shoulder portion.

* * * * *